(12) United States Patent　(10) Patent No.:　US 12,661,596 B2

Smith　(45) Date of Patent:　Jun. 23, 2026

(54) TROLLEY LAUNCHER SYSTEM FOR ZIPLINES

(71) Applicant: Skyline Ziplines Holdings Ltd., Whistler (CA)

(72) Inventor: Isiah Geoffrey Smith, Whistler (CA)

( * ) Notice: Subject to any disclaimer, the term of this patent is extended or adjusted under 35 U.S.C. 154(b) by 551 days.

(21) Appl. No.: 18/270,173

(22) PCT Filed: Dec. 30, 2020

(86) PCT No.: PCT/CA2020/051806

§ 371 (c)(1),
(2) Date: Jun. 28, 2023

(87) PCT Pub. No.: WO2022/140835

PCT Pub. Date: Jul. 7, 2022

(65) Prior Publication Data

US 2024/0058711 A1　Feb. 22, 2024

(51) Int. Cl.
*A63G 21/22*　(2006.01)
*B61D 7/00*　(2006.01)
*F16D 63/00*　(2006.01)

(52) U.S. Cl.
CPC .............. *A63G 21/22* (2013.01); *B61D 7/00* (2013.01); *F16D 63/008* (2013.01)

(58) Field of Classification Search
CPC .... B61B 7/00; B61B 7/02; B61B 7/04; B61B 7/045; B61B 7/06; B61B 9/00; A63G 21/22; F16D 63/008
See application file for complete search history.

(56) References Cited

U.S. PATENT DOCUMENTS

| | | | | |
|---|---|---|---|---|
| 2016/0038841 A1* | 2/2016 | Cylvick | ................. | A63G 21/22 |
| | | | | 104/113 |
| 2017/0144678 A1* | 5/2017 | Cylvick | ............... | B61B 12/002 |

FOREIGN PATENT DOCUMENTS

| | | | | |
|---|---|---|---|---|
| CA | 2984689 A1 | 12/2016 | | |
| KR | 101770650 B1 * | 8/2017 | ............... | B61B 7/00 |
| KR | 101793201 B1 * | 11/2017 | ............ | A63G 21/22 |
| WO | WO-2011063494 A1 * | 6/2011 | ............... | B61B 7/00 |
| WO | WO-2020032805 A1 * | 2/2020 | ............ | A63G 21/20 |

* cited by examiner

*Primary Examiner* — Robert J McCarry, Jr.

(57) ABSTRACT

A launcher for a zipline trolley system comprises a body, first and second arms, first and second connectors, first and second pads, and an actuating portion. The first and second arms extend from the body. The first and second connectors are pivotably connected to the first and second arms, respectively. The first and second pads are connected to the first and second connectors, respectively. The actuating portion comprises a sliding member and first and second pull arms. The first and second pull arms are connected to the first and second connectors, respectively. When the launcher is in a first configuration, the first and second pads are adapted to hold the trolley in place. Movement of the sliding member away from the body causes pivotable movement of the first and second connectors and a transition of the launcher to a second configuration to release the trolley.

26 Claims, 6 Drawing Sheets

TROLLEY LAUNCHER SYSTEM FOR ZIPLINES

FIELD OF THE INVENTION

The present invention relates to zipline systems. In particular, the invention relates to a launcher to launch a zipline trolley in a zipline system and an associated system for controlling or monitoring the zipline system.

BACKGROUND OF THE INVENTION

Zipline systems are recreational rides that typically comprise a trolley that travels along a suspended cable generally from a higher point of elevation to a lower point of elevation with the help of gravity. A rider is usually fitted with a harness (and other safety equipment such as a helmet) and ascends to a launching platform. At the launching platform, the rider is usually secured to the zipline trolley. The trolley typically comprises a frame with wheels that roll along the top of the cable for maneuvering the rider from the launching platform to a landing platform. The system usually comprises a braking system at the end of the ride for safe and controlled landing at the landing platform.

At the launching platform, release of the rider is usually done manually, by the rider him/herself and/or under the supervision and control of a zipline operator personnel. Launching the rider/zipline trolley this way can be risky as the rider/zipline trolley may be accidentally released or released too early by the rider/operator. The present invention provides a safer and more precise means of launching the rider/zipline trolley and reduces the risk of rider/operator error.

SUMMARY OF THE INVENTION

In one embodiment of the invention, a launcher is provided for a zipline trolley system with a trolley riding along a zipline. The launcher comprises a body, first and second arms, first and second connectors, first and second pads, and an actuating portion. The body is rigidly attached to the zipline. The first and second arms extend from the body. The first connector is pivotably connected to the first arm, and the second connector is pivotably connected to the second arm. The first pad is connected to the first connector, and the second pad is connected to the second connector. The actuating portion comprises a sliding member, adapted to slidably engage with the body, and first and second pull arms. The first pull arm is connected to the first connector, and the second pull arm is connected to the second connector. When the launcher is in a first configuration, the first and second pads are adapted to hold the trolley in place. Movement of the sliding member away from the body causes pivotable movement of the first and second connectors and a transition of the launcher to a second configuration. The pivotable movement of the first and second connectors effects outward movement of the first and second pads and a release of the trolley from the launcher.

In another embodiment, the actuating portion further comprises a piston assembly, the piston assembly comprising a cylinder, a piston, and an actuator. The cylinder is attached to the body. The piston is slidably movable within the cylinder and connected to the sliding member. The actuator is adapted to move the piston within the cylinder.

In yet another embodiment, the actuator is adapted to move the piston within the cylinder and away from the body to effect the release of the trolley from the launcher.

In still yet another embodiment, each of the first and second connectors comprise a connector vertex and first and second portions extending from the connector vertex. The first and second portions are angled from each other.

In a further embodiment, the first and second arms are pivotably connected to the first and second connectors, respectively, proximate to the connector vertices.

In still a further embodiment, the first and second pull arms are connected to the first and second connectors, respectively, at the first portions.

In yet still a further embodiment, the first and second pads are connected to the first and second connectors, respectively, at the second portions.

In another embodiment, the body comprises one or more channels adapted to receive the sliding member. The sliding member is adapted to slide along the one or more channels.

In still another embodiment, the body comprises first and second clamps adapted to attach to each other to fixedly engage with the zipline.

In yet still another embodiment, the body comprises first and second body portions adapted to attach to each other to, at least partially, enclose the first and second clamps.

In another embodiment, a zipline trolley system comprises a zipline extending from a starting point to an ending point, one or more trolleys, a launcher, one or more user RFID tags, a server, and a launch RFID reader. Each of the trolleys is adapted to allow a user to ride along the zipline. Each of the trolleys comprises a trolley radio-frequency identification (RFID) tag, wherein each of the trolley RFID tags is associated with a trolley identifier. The launcher is located on the zipline proximate to the starting point. Each of the user RFID tags is attached to one of the users, and wherein each of the user RFID tags is associated with a user identifier. The server is configured to associate one of the trolley identifiers with one of the user identifiers. The launch RFID reader is located proximate to the launcher or the starting point and is in communications with the server. The launch RFID reader is configured to read the trolley identifier from the trolley RFID tag, to read the user identifier from the user RFID tag, and to transmit the trolley identifier and the user identifier to the server. The server is further configured to determine whether the trolley identifier is associated with the user identifier.

In still another embodiment, the zipline trolley system further comprises a control panel in communications with the launcher and the server. The server is further configured to transmit a mismatch alert to the control panel if the server determines that the trolley identifier is not associated with the user identifier.

In a further embodiment, the control panel is configured to display the mismatch alert upon receipt of the mismatch alert.

In still a further embodiment, the control panel is further configured to prevent the launcher from releasing the trolley upon receipt of the mismatch alert.

The foregoing was intended as a broad summary only and of only some of the aspects of the invention. Other aspects of the invention will be more fully appreciated by reference to the detailed description and the drawings.

BRIEF DESCRIPTION OF THE DRAWINGS

The invention will be described by reference to the detailed description and to the drawings thereof in which.

DETAILED DESCRIPTION OF THE INVENTION

Figure 1:
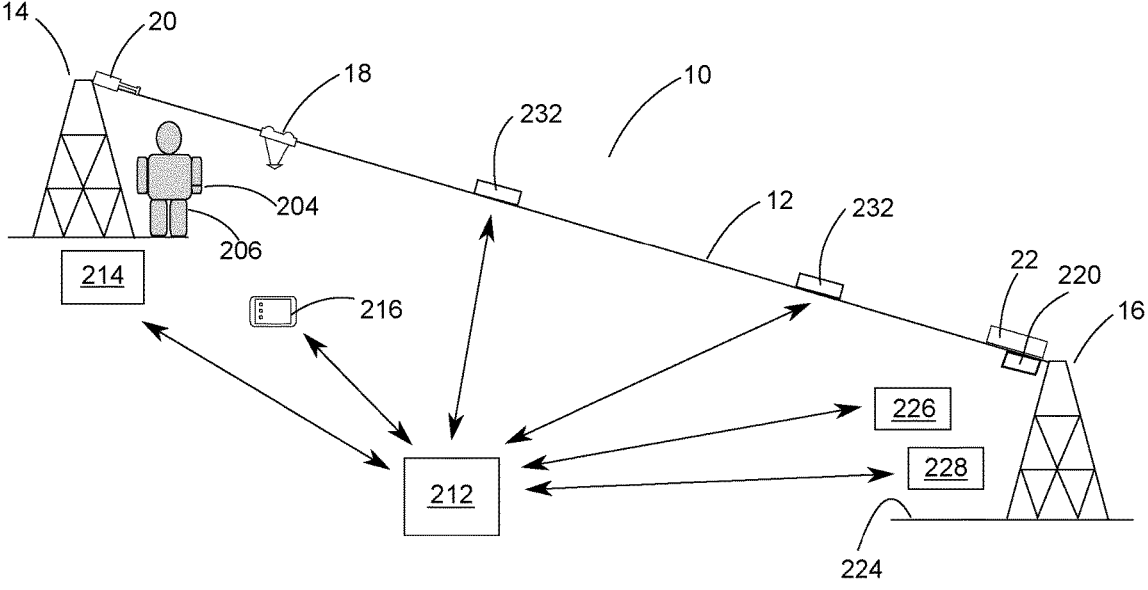
FIG. 1 shows a zipline system in accordance with the present invention.

Referring to FIG. 1, a zipline system 10 comprises a zipline 12 extending between a starting point 14 and an ending point 16. One or more trolleys 18 are adapted to slide along the zipline 12 between the starting point 14 and the ending point 16. Preferably, the starting point 14 is elevated with respect to the ending point 16 such that the trolleys 18 are able to use gravity to travel between the starting point 14 and the ending point 16.

Preferably, the zipline system 10 further comprises a launcher 20 located proximate to the starting point 14. The launcher 20 is adapted to hold the trolley 18 in place on the zipline 12 and to release the trolley 18 at an appropriate time for travel along the zipline 12. In addition, the zipline system 10 may comprise a brake 22 located proximate to the ending point 16. The brake 22 is adapted to stop the trolley 18 before it reaches the ending point 16.

Referring to FIGS. 2 to 10, the launcher 20 comprises a body 24 that is attached to the zipline 12. The body 24 comprises first and second clamps 26, 28 that fit about the zipline 12 (see FIG. 9). Preferably, each of the first and second clamps 26, 28 comprises a clamp surface 30 with a groove 32. When the first and second clamps 26, 28 are attached together, the corresponding grooves 32 on the first and second clamps 26, 28 define a passage 33 for engaging the zipline 12. The first and second clamps 26, 28 may be attached together to fixedly engage the first and second clamps 26, 28 to the zipline 12. For example, the first and second clamps 26, 28 may comprise clamp through-holes 36 for receiving clamp fasteners 38 (such as screws) for securing the first and second clamps 26, 28 together. Other means for attaching the first and second clamps 26, 28 together are also possible, such as by using adhesives, welding, etc. Preferably, once the first and second clamps 26, 28 are attached together about the zipline 12, the first and second clamps 26, 28 are fixedly engaged to the zipline 12 and are unable to slide along or rotate about the zipline 12.

In another embodiment, the first and second clamps 26, 28 may be combined as a single unitary piece that is able to be fixedly engaged to the zipline 12 such that it is unable to slide along or rotate about the zipline 12.

The body 24 preferably further comprises first and second body portions 40, 42 that may be attached together to, at least partially, enclose the first and second clamps 26, 28. The first and second body portions 40, 42 may comprise body through-holes 44 for receiving body fasteners 46 (such as screws) for securing the first and second body portions 40, 42 together. Other means for attaching the first and second body portions 40, 42 together are also possible, such as by using adhesives, welding, etc. Preferably, once the first and second body portions 40, 42 are attached together about the first and second clamps 26, 28, the first and second body portions 40, 42 are fixedly engaged to the first and second clamps 26, 28 such that the first and second body portions 40, 42 are unable to move with respect to the first and second clamps 26, 28. Therefore, when the first and second clamps 26, 28 are fixedly engaged to the zipline 12 and the first and second body portions 40, 42 are fixedly engaged to the first and second clamps 26, 28, the body 24 is unable to slide along or rotate about the zipline 12. Preferably, an opening 34 is provided through which the zipline 12 is able to pass.

Figures 3, 4:
FIG. 3 is a top perspective view of the launcher of FIG. 2.
FIG. 4 is a bottom perspective view of the launcher of FIG. 2.
Figures 5, 6:
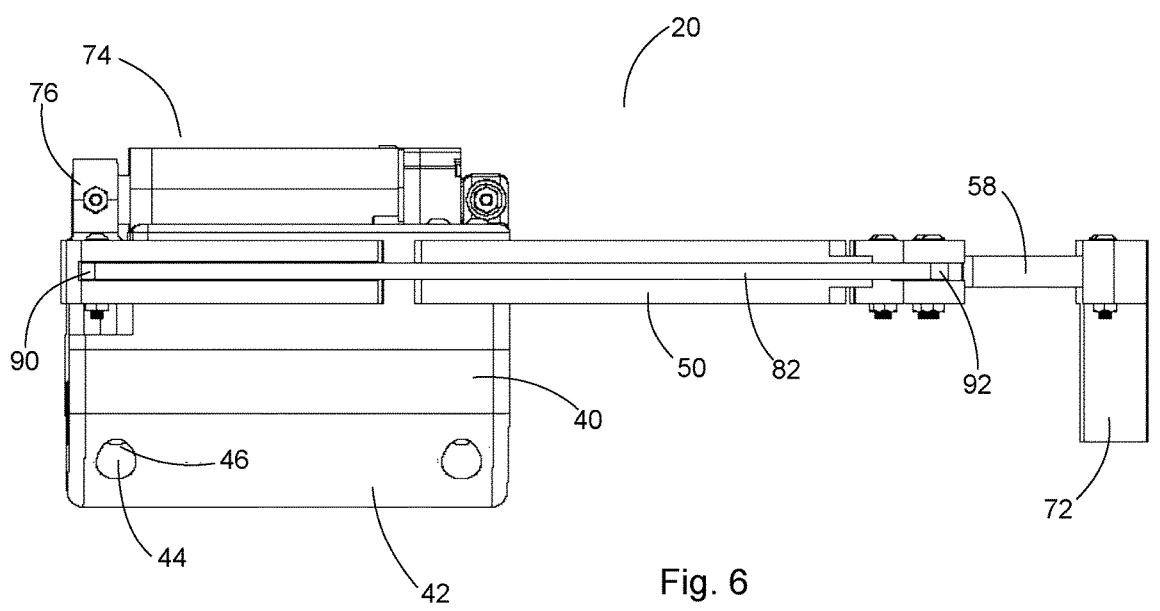
FIG. 5 is an exploded view of the launcher of FIG. 2.
FIG. 6 is a side view of the launcher of FIG. 2.
Figure 7:
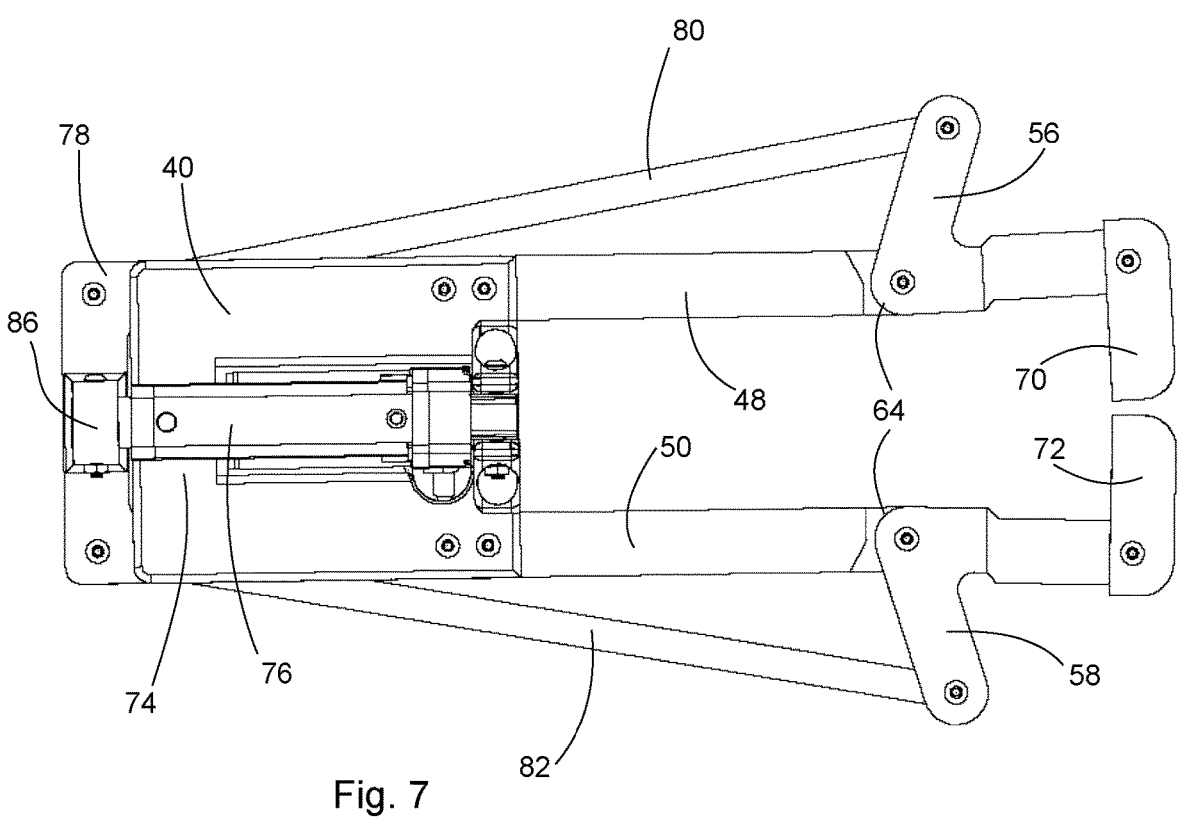
FIG. 7 is a top view of the launcher of FIG. 2.
Figure 8:
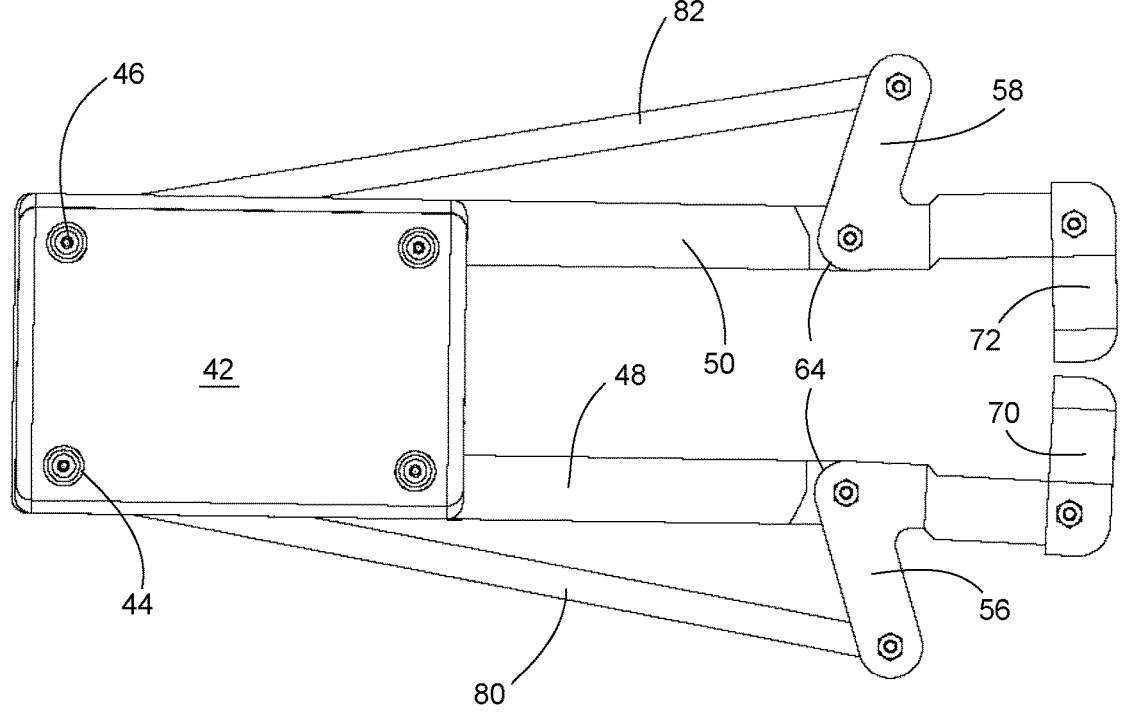
FIG. 8 is a bottom view of the launcher of FIG. 2.
Figure 9:
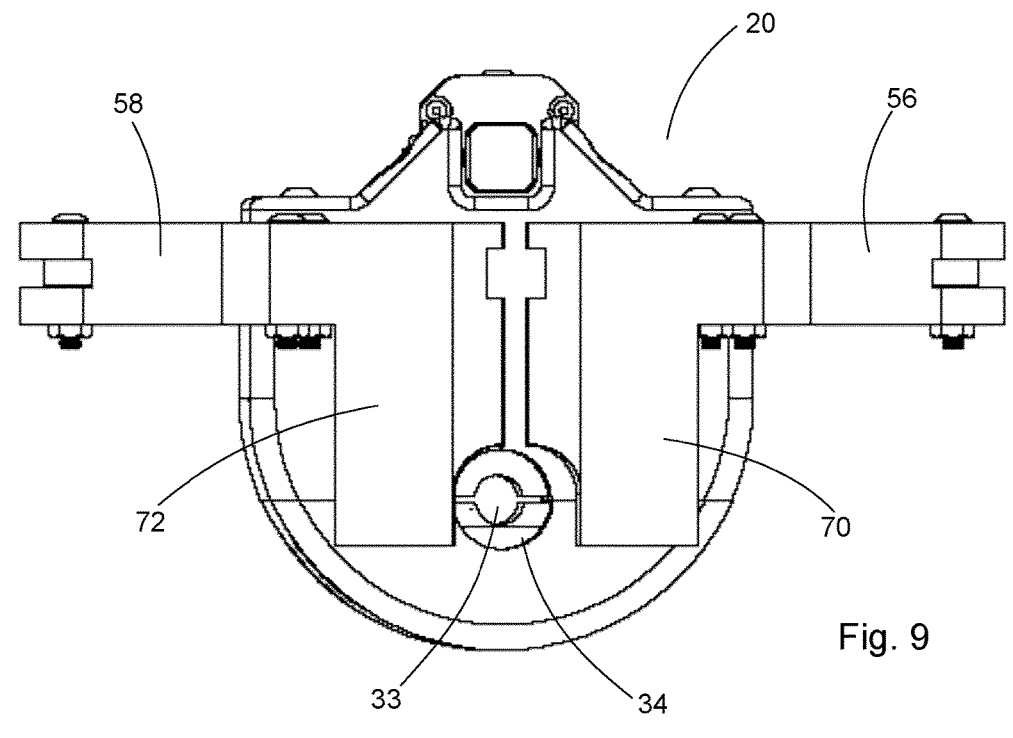
FIG. 9 is a front view of the launcher of FIG. 2.
Figure 10:
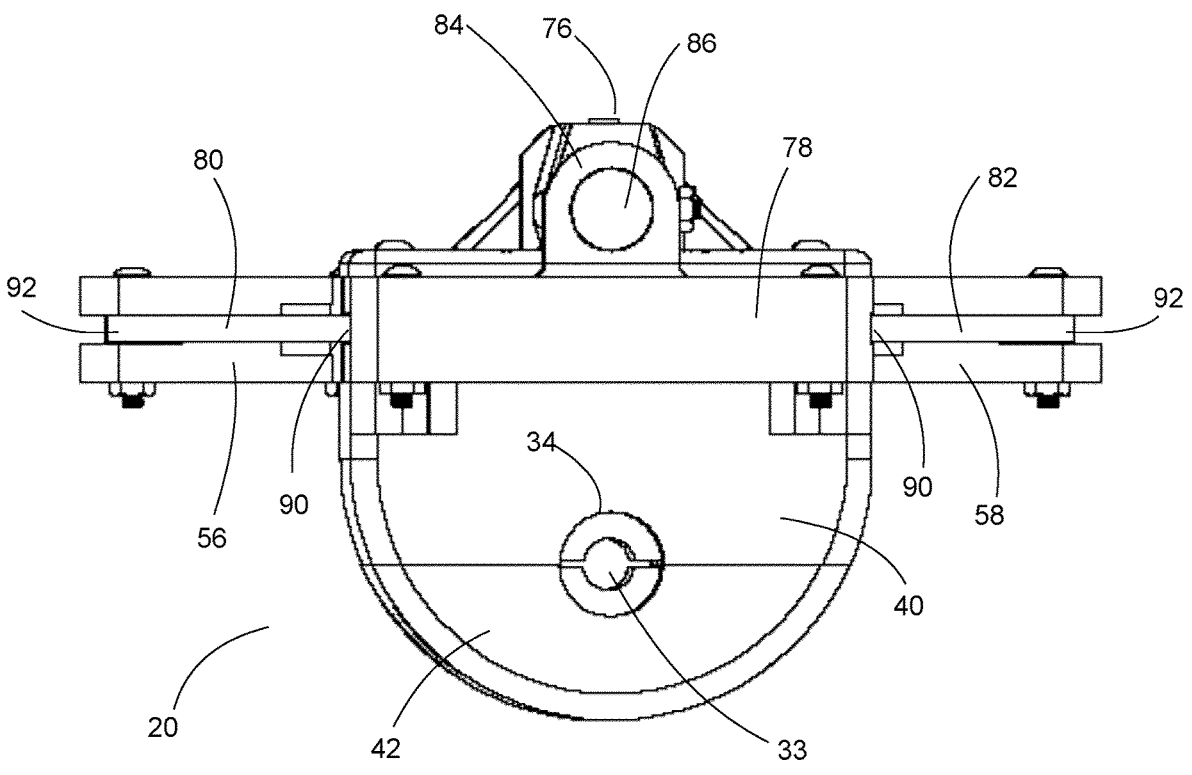
FIG. 10 is a rear view of the launcher of FIG. 2.

Referring to FIGS. 3 and 5, the launcher 20 further comprises first and second arms 48, 50 extending from the body 24. Each of the first and second arms 48, 50 comprises an arm first end 52 and an arm second end 54. The first and second arms 48, 50 are preferably rigidly attached to the body 24 proximate to the arm first ends 52. Preferably, the first and second arms 48, 50 extend from the body 24 in a direction that is generally parallel to the zipline 12; however, it is possible for the first and second arms 48, 50 to extend from the body 24 at different angles.

The launcher 20 further comprises first and second connectors 56, 58. The first connector 56 is pivotably connected to the first arm 48 proximate to the arm second end 54 of the first arm 48. The second connector 58 is pivotably connected to the second arm 50 proximate to the arm second end 54 of the second arm 50.

Referring to FIG. 5, the first and second connectors 56, 58 may be generally L-shaped or V-shaped, comprising connector first portion 60 and connector second portion 62 generally angled with respect to each other and meeting at a connector vertex 64. The first connector 56 is pivotably connected to the first arm 48 proximate to the connector vertex 64 of the first connector 56. The second connector 58 is pivotably connected to the second arm 50 proximate to the connector vertex 64 of the second connector 58.

Each of the first and second connectors 56, 58 also comprise a connector first end 66 and a connector second end 68.

The launcher 20 further comprises first and second pads 70, 72. The first pad 70 is preferably rigidly attached to the first connector 56 proximate to the connector second end 68 of the first connector 56. The second pad 72 is preferably rigidly attached to the second connector 58 proximate to the connector second end 68 of the second connector 58. The first and second pads 70, 72 are adapted to hold the trolley 18 in place (as described below) until the appropriate time for releasing the trolley 18 is reached.

Referring to FIG. 5, the launcher 20 has an actuating portion 74 comprising a piston assembly 76, a sliding member 78, first and second pull arms 80, 82, and an actuator 94. The piston assembly 76 comprises a cylinder 84 with a piston 86 slidably movable within the cylinder 84. The cylinder 84 is attached to the body 24, for example to the first body portion 40. The piston 86 is operably connected to the sliding member 78. The sliding member 78 is adapted to slidably engage with the body 24. For example, the body 24 may comprise one or more channels 88 for engaging with the sliding member 78. In the embodiment shown in FIGS. 2 to 11, the first body portion 40 comprises two channels 88, located laterally, for engaging with the sliding member 78.

Each of the first and second pull arms 80, 82 comprises pull arm first end 90 and pull arm second end 92. The first and second pull arms 80, 82 are pivotably connected to the sliding member 78 proximate to the corresponding pull arm first ends 90. The first and second pull arms 80, 82 are also pivotably connected to the first and second connectors 56, 58, respectively. In particular, the first pull arm 80 may be pivotably connected to the first connector 56 at a location proximate to the pull arm second end 92 and the connector first end 66. Similarly, the second pull arm 82 may be pivotably connected to the second connector 58 at a location proximate to the pull arm second end 92 and the connector first end 66.

Figure 11:
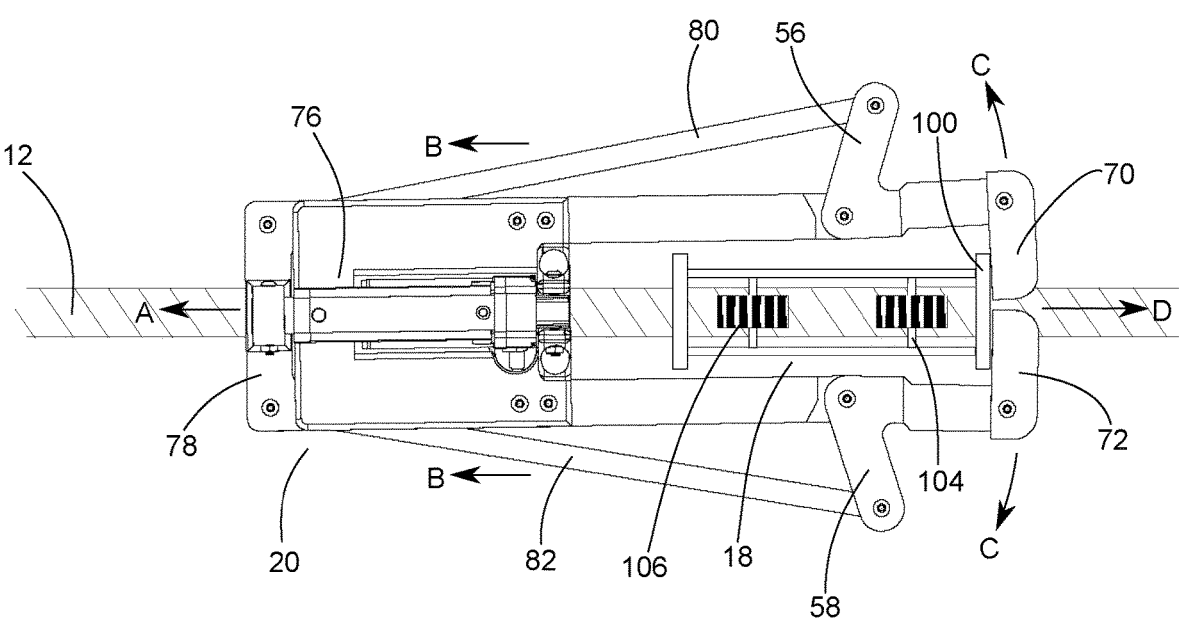
FIG. 11 is a top view of the launcher and the trolley of FIG. 2.

FIG. 11 depicts the piston assembly 76 in a state where the piston 86 is fully retracted within the cylinder 84. An actuator 94 is configured to cause the piston 86 to move within the cylinder 84 away from the body 24. For example, the actuator 94 may be configured to cause the piston 86 to move outward within the cylinder 84 (in direction A). Because of the connection between the piston 86 and the sliding member 78, this outward movement of the piston 86 will also cause the sliding member 78 to move (also in direction A) along the channels 88 away from the body 24. By moving away from the body 24, the sliding member 78 will cause the first and second pull arms 80, 82 to pull on the first and second connectors 56, 58, respectively, in direction B.

Because of the pivotable connection between the first and second connectors 56, 58 and the first and second arms 48, 50, respectively, the pulling action of the first and second pull arms 80, 82 will cause each of the connector second ends 68 of the first and second connectors 56, 58 to pivot outwardly (in directions C). This in turn will cause the first and second pads 70, 72 to move apart from one another. For example, when the piston 86 is fully retracted within the cylinder 84 (as shown in FIG. 5), the first and second pads 70, 72 are oriented substantially perpendicularly to the zipline 12 and pointed inwardly. However, as the piston 86 is moved outward away from the body 24, the resulting movements of the sliding member 78, the first and second pull arms 80, 82, and the first and second connectors 56, 58 will cause the first and second pads 70, 72 to move further apart from each other.

Figure 2:
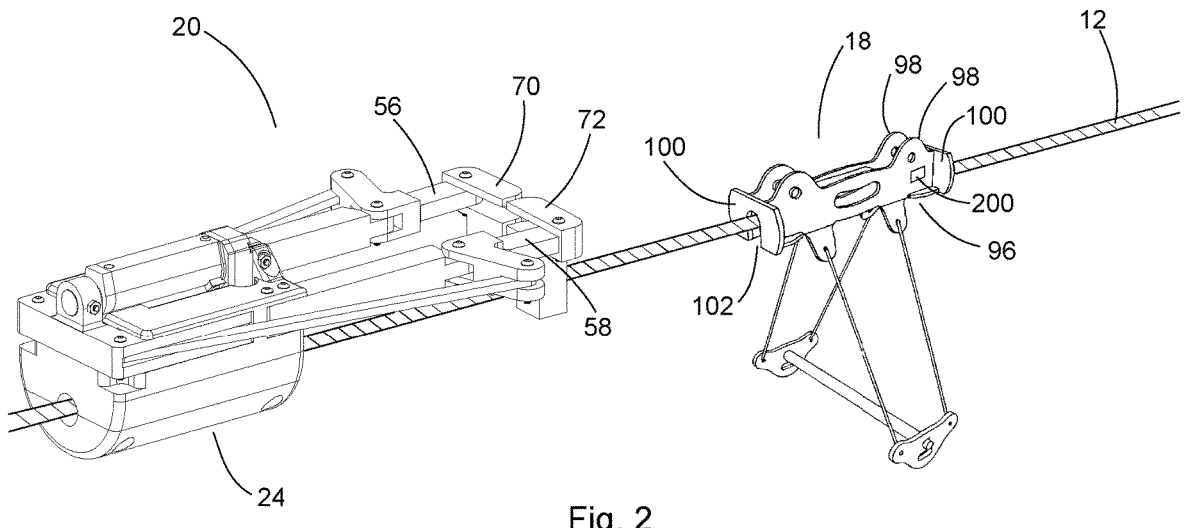
FIG. 2 shows the launcher and the trolley of the zipline system of FIG. 1.

Referring to FIGS. 2 and 11, the trolley 18 comprises a frame 96. The frame 96 comprises a pair of flanges 98 arranged substantially parallel to each other and a pair of faceplates 100 arranged substantially perpendicularly to the distal ends of the flanges 98. The flanges 98 and the faceplates 100 thereby form a box-like configuration. Preferably, the faceplates 100 comprise one or more slits 102 to allow the zipline 12 to extend through the frame 96 and to allow the frame 96 to be placed over the zipline 12. One or more axles 104 extend between the flanges 98, with the axles 104 supporting wheels 106 that ride on the zipline 12.

Operation of the launcher 20 will now be described. In the configuration shown in FIG. 11, the launcher 20 is holding the trolley 18 in place in anticipation of the trolley 18 being released. In this configuration, the piston 86 is fully retracted within the cylinder 84, with the first and second pads 70, 72 extending over one of the faceplates 100 of the trolley 18. The position of the first and second pads 70, 72 holds the faceplate 100 (and thereby the trolley 18) in place with respect to the launcher 20.

When the trolley 18 is to be released, the actuator 94 will cause the piston 86 to move outward in the cylinder 84 in direction A. This in turn will cause the first and second pull arms 80, 82 to move in direction B, resulting in the first and second connectors 56, 58 to pivot outward in direction C. This will cause the first and second pads 70, 72 to move apart from one another. As the first and second pads 70, 72 move apart from each other, they may slide along the faceplate 100, towards the lateral edges of the faceplate 100.

Eventually, when the first and second pads 70, 72 move past the lateral edges of the faceplate 100, the trolley 18 will no longer be held in place by the first and second pads 70, 72, and the trolley 18, assisted by gravity, will move along the zipline 12, away from the launcher 20 in direction D.

Figure 12:
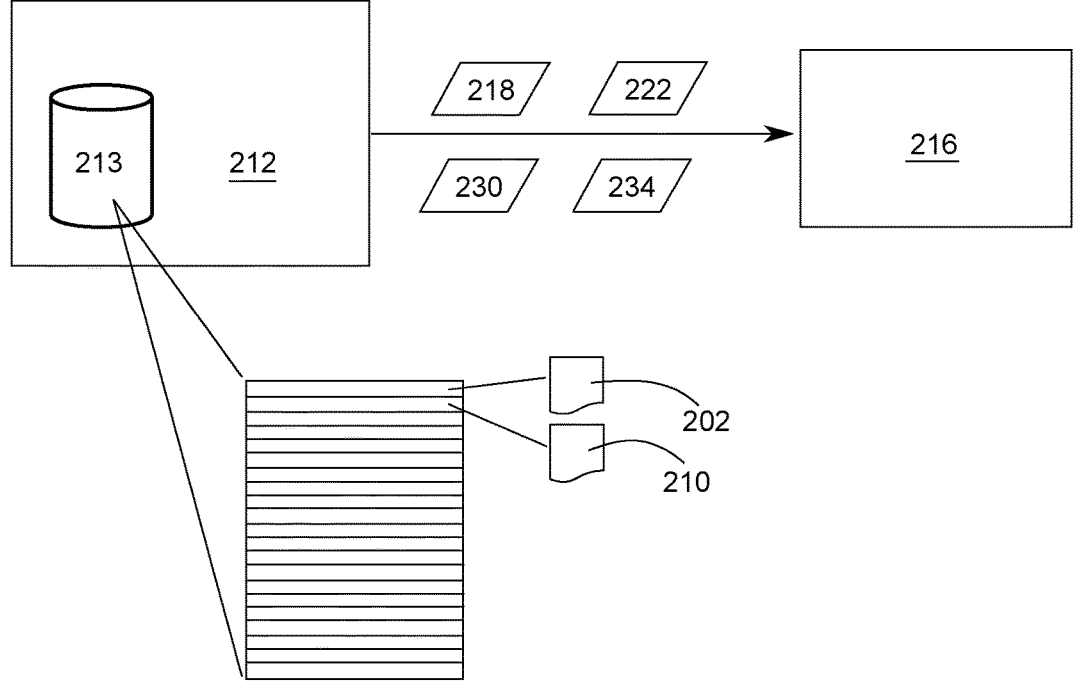
FIG. 12 shows some of the components of the zipline system of FIG. 1.

Referring to FIGS. 1 and 12, in another embodiment, each of the trolleys 18 may comprise a trolley radio-frequency identification (RFID) tag 200. The trolley RFID tag 200 may be mounted on the frame 96 or on another part of the trolley 18. The trolley RFID tag 200 provides a unique trolley identifier 202 to the trolley 18.

A user RFID tag 204 may also be provided, with the user RFID tag 204 being located on an item that may be easily attached to each of the users 206. For example, the user RFID tag 204 may be located on a wristband or an article of clothing worn by the user 206. The user RFID tag 200 provides a unique user identifier 210 to the user 206.

Each of the users 206 may be associated with one of the trolleys 18. For example, the physical characteristics of the user 206 may dictate special requirements for the trolley 18 that can be associated with the user 206. Users 206 that are heavier, for example, may require trolleys 18 that can withstand greater weight. Therefore, these conditions may be taken into account when the user 206 is associated with one of the trolleys 18.

A central server 212 and database 213 is configured to track and record the association between the users 206 and the trolleys 18. For example, the server 212 may record the user identifier 210 for each of the users 206 and the associated trolley identifier 202 for the trolley 18 associated with each of the users 206. A launch RFID reader 214 may be provided proximate to the starting point 14 or the launcher 20. The launch RFID reader 214 is configured to read the trolley identifier 202 from the trolley RFID tag 200 and the user identifier 210 from the user RFID tag 204 when the user 206 and the associated trolley 18 approach the launcher 20. The trolley identifier 202 and the user identifier 210 are communicated from the launch RFID reader 214 to the server 212. The communications between the launch RFID reader 214 and the server 212 may be done through wired or wireless communications using conventional data communications protocols.

The server 212 is configured to determine whether the trolley identifier 202 and the user identifier 210 received from the launch RFID reader 214 are properly associated. In other words, the server 212 is configured to determine whether the trolley identifier 202 relates to the trolley 18 that is supposed to be associated with the user identifier 210 of the particular user 206. This may be done by matching the trolley identifier 202 and the user identifier 210 received from the launch RFID reader 214 with records that show the proper associations between the trolley identifiers 202 and the user identifiers 210.

If the server 212 determines that the trolley identifier 202 and the user identifier 210 are properly associated (i.e. the user 206 has the correct trolley 18), such an indication may be communicated to a control panel 216 located proximate to the starting point 14 or the launcher 20. If, however, the server 212 determines that the trolley identifier 202 and the user identifier 210 are not properly associated (i.e. the user 206 has the incorrect trolley 18), the server 212 may generate a mismatch alert 218 that is communicated to the control panel 216, thus providing a warning to the user 206 and others of the mismatch (such as a visual and/or auditory warning). In one embodiment, the control panel 216 is connected to the launcher 20, so that if the control panel 216 receives the alert 218, the control panel 216 will prevent any launch of the trolley 18 (e.g. by preventing the actuator 94 from activating. Alternatively, the server 212 is connected to the launcher 20, so that the server 212 is able to prevent any launch of the trolley 18 in the event of the mismatch alert 218.

In another embodiment, the brake 22 is configured to slow down, and eventually stop, the trolley 18 before it reaches the ending point 16. For example, the brake 22 may comprise a spring or some other elastic or compressible material that is intended to slow the trolley 18 when the trolley 18 first engages or contacts the brake 22. In order to prevent a stop that is too abrupt, the brake 22 is configured to allow the trolley 18 to travel a short distance after engagement, until the trolley 18 reaches a landing area 224. When the trolley 18 has come to a complete stop, the trolley 18 may be removed from the zipline 12, and the brake 22 may be reset to prepare to accept the next one of the trolleys 18.

However, it is important that once the trolley 18 has stopped, the trolley 18 is removed and the landing area 224 is cleared before the next one of the trolleys 18 is launched by the launcher 20. This is to prevent collisions between successive ones of the users 206. Furthermore, it is also important that the brake 22 is reset to prepare for the next one of the trolleys 18. If the brake 22 is not reset, then the next one of the trolleys 18 engaging the brake 22 will not have the benefit of being slowed down by the brake 22, which may result in serious injury.

A brake reset sensor 220 is preferably located on the brake 22. The brake reset sensor 220 is able to detect if the status of the brake 22 is in the "ready" configuration (i.e. the brake 22 has been reset and is prepare to accept the next one of the trolleys 18). The brake reset sensor 220 is able to transmit the status of the brake 22 to the server 212. If the brake reset sensor 220 indicates to the server 212 that the brake 22 has not yet been reset (i.e. not in the "ready" configuration), the server 212 will generate a brake alert 222 for communication to the control panel 216. The control panel 216 is configured to provide a warning regarding the brake alert 222 (e.g. a visual and/or auditory warning). If the control panel 216 is connected to the launcher 20, the control panel 216 may also prevent any launch of the trolley 18. Alternatively, if the server 212 is connected to the launcher 20, the server 212 may also prevent any launch of the trolley 18.

In addition, a landing sensor 226 may be provided to detect when the trolley 18 has been removed from the zipline 12 and when the landing area 224 is clear. The landing sensor 226 may comprise a motion sensor that detects when movement in the landing area 224. Alternatively, instead of a landing sensor 226, a switch 228 may be provided that may be toggled when the landing area 224 is clear. The landing sensor 226 and/or the switch 228 may transmit to the server 212 the status of the landing area 224. For example, if the landing sensor 226 detects movement in the landing area 224 or if the switch 228 is not yet toggled, then this status may be transmitted to the server 212. Based on this information, the server 212 may generate a landing alert 230 for communication to the control panel 216. The control panel 216 is configured to provide a warning regarding the landing alert 230 (e.g. a visual and/or auditory warning). If the control panel 216 is connected to the launcher 20, the control panel 216 may also prevent any launch of the trolley 18. Alternatively, if the server 212 is connected to the launcher 20, the server 212 may also prevent any launch of the trolley 18.

In another embodiment, a line tension sensor 232 may be located at one or more points along the zipline 12. The line tension sensor 232 is able to measure the line tension of the zipline and transmit this information to the server 212. Based on this information, the server 212 is able to determine whether the line tension of the zipline 12 is appropriate and within normal operating parameters. If the server 212 determines that the line tension is not within normal operating parameters, the server 212 is configured to generate a line tension alert 234 for communication to the control panel 216. The control panel 216 will provide a warning regarding the line tension alert 234 (e.g. a visual and/or auditory warning). If the control panel 216 is connected to the launcher 20, the control panel 216 may also prevent any launch of the trolley 18. Alternatively, if the server 212 is connected to the launcher 20, the server 212 may also prevent any launch of the trolley 18.

It will be appreciated by those skilled in the art that the preferred embodiment has been described in some detail but that certain modifications may be practiced without departing from the principles of the invention.

The invention claimed is:

1. A launcher for a zipline trolley system with a trolley riding along a zipline, the launcher comprising:
   a body rigidly attached to the zipline;
   first and second arms extending from the body;
   first and second connectors, wherein the first connector is pivotably connected to the first arm, and wherein the second connector is pivotably connected to the second arm;
   first and second pads, wherein the first pad is connected to the first connector, and wherein the second pad is connected to the second connector; and
   an actuating portion comprising:
      a sliding member adapted to slidably engage with the body; and
      first and second pull arms, wherein the first pull arm is connected to the first connector, and wherein the second pull arm is connected to the second connector;
   wherein when the launcher is in a first configuration, the first and second pads are adapted to hold the trolley in place; and
   wherein movement of the sliding member away from the body causes pivotable movement of the first and second connectors and a transition of the launcher to a second configuration, the pivotable movement of the first and second connectors effecting outward movement of the first and second pads and a release of the trolley from the launcher.

2. The launcher of claim 1, wherein the actuating portion further comprises a piston assembly, the piston assembly comprising:
   a cylinder attached to the body;
   a piston slidably movable within the cylinder and connected to the sliding member; and
   an actuator adapted to move the piston within the cylinder.

3. The launcher of claim 2, wherein the actuator is adapted to move the piston within the cylinder and away from the body to effect the release of the trolley from the launcher.

4. The launcher of claim 1, wherein each of the first and second connectors comprise:
   a connector vertex; and
   first and second portions extending from the connector vertex, the first and second portions angled from each other.

5. The launcher of claim 4, wherein the first and second arms are pivotably connected to the first and second connectors, respectively, proximate to the connector vertices.

6. The launcher of claim 5, wherein the first and second pull arms are connected to the first and second connectors, respectively, at the first portions.

7. The launcher of claim 5, wherein the first and second pads are connected to the first and second connectors, respectively, at the second portions.

8. The launcher of claim 1, wherein the body comprises one or more channels adapted to receive the sliding member, and wherein the sliding member is adapted to slide along the one or more channels.

9. The launcher of claim 1, wherein the body comprises first and second clamps adapted to attach to each other to fixedly engage with the zipline.

10. The launcher of claim 9, wherein the body comprises first and second body portions adapted to attach to each other to, at least partially, enclose the first and second clamps.

11. A zipline trolley system comprising:

a zipline extending from a starting point to an ending point;

one or more trolleys, each of the trolleys adapted to allow a user to ride along the zipline, each of the trolleys comprising a trolley radio-frequency identification (RFID) tag, wherein each of the trolley RFID tags is associated with a trolley identifier;

the launcher of claim 1, the launcher located on the zipline proximate to the starting point;

one or more user RFID tags, wherein each of the user RFID tags is attached to one of the users, and wherein each of the user RFID tags is associated with a user identifier;

a server, wherein the server is configured to associate one of the trolley identifiers with one of the user identifiers; and a launch RFID reader located proximate to the launcher or the starting point, wherein the launch RFID reader is in communications with the server, and wherein the launch RFID reader is configured to read the trolley identifier from the trolley RFID tag, to read the user identifier from the user RFID tag, and to transmit the trolley identifier and the user identifier to the server;

wherein the server is further configured to determine whether the trolley identifier is associated with the user identifier.

12. The zipline trolley system of claim 11, further comprising a control panel in communications with the launcher and the server, wherein the server is further configured to transmit a mismatch alert to the control panel if the server determines that the trolley identifier is not associated with the user identifier.

13. The zipline trolley system of claim 12, wherein the control panel is configured to display the mismatch alert upon receipt of the mismatch alert.

14. The zipline trolley system of claim 13, wherein the control panel is further configured to prevent the launcher from releasing the trolley upon receipt of the mismatch alert.

15. The zipline trolley system of claim 14, further comprising:

a brake located proximate to the ending point, the brake adapted to stop one of the trolleys before the trolley reaches the ending point by engaging with the trolley; and a brake reset sensor located on the brake, the brake reset sensor adapted to detect if the brake has been reset following engagement of the trolley, wherein the brake reset sensor is in communications with the server.

16. The zipline trolley system of claim 15, wherein the server is further configured to transmit a brake alert to the control panel if the server determines that the brake has not been reset.

17. The zipline trolley system of claim 16, wherein the control panel is further configured to display the brake alert upon receipt of the brake alert.

18. The zipline trolley system of claim 17, wherein the control panel is further configured to prevent the launcher from releasing the trolley upon receipt of the brake alert.

19. The zipline trolley system of claim 18, further comprising a landing sensor located proximate to the ending point, the landing sensor adapted to detect movement in an area proximate to the ending point, wherein the landing sensor is in communications with the server.

20. The zipline trolley system of claim 19, wherein the server is further configured to transmit a landing alert to the control panel if the server determines that movement is detected proximate to the ending point.

21. The zipline trolley system of claim 20, wherein the control panel is further configured to display the landing alert upon receipt of the landing alert.

22. The zipline trolley system of claim 21, wherein the control panel is further configured to prevent the launcher from releasing the trolley upon receipt of the landing alert.

23. The zipline trolley system of claim 22, further comprising one or more line tension sensors located at one or more locations along the zipline, the line tension sensors adapted to detect line tension proximate to the locations, wherein the line tension sensors are in communications with the server.

24. The zipline trolley system of claim 23, wherein the server is further configured to transmit a line tension alert to the control panel if the server determines that the line tension at one or more of the locations is outside of a particular range.

25. The zipline trolley system of claim 24, wherein the control panel is further configured to display the line tension alert upon receipt of the line tension alert.

26. The zipline trolley system of claim 25, wherein the control panel is further configured to prevent the launcher from releasing the trolley upon receipt of the line tension alert.

\* \* \* \* \*